(12) United States Patent
Duggimpudi et al.

(10) Patent No.: US 11,100,415 B2
(45) Date of Patent: Aug. 24, 2021

(54) ARCHITECTURE AND METHOD FOR PROVIDING INSIGHTS IN NETWORKS DOMAIN

(71) Applicant: University of Louisiana at Lafayette, Lafayette, LA (US)

(72) Inventors: Maria Bala Duggimpudi, Lafayette, LA (US); Abdelhamid Moursy, Spring, TX (US); Elshaimaa Ali, Spring, TX (US); Vijay V. Raghavan, Lafayette, LA (US)

(*) Notice: Subject to any disclaimer, the term of this patent is extended or adjusted under 35 U.S.C. 154(b) by 995 days.

(21) Appl. No.: 15/724,495

(22) Filed: Oct. 4, 2017

(65) Prior Publication Data

US 2018/0096255 A1 Apr. 5, 2018

Related U.S. Application Data

(60) Provisional application No. 62/403,972, filed on Oct. 4, 2016.

(51) Int. Cl.

| | |
|---|---|
| *G06N 7/00* | (2006.01) |
| *G06N 5/02* | (2006.01) |
| *G06F 16/36* | (2019.01) |
| *G06F 16/2457* | (2019.01) |
| *G06F 3/0484* | (2013.01) |
| *H04L 29/08* | (2006.01) |
| *G06N 5/00* | (2006.01) |

(52) U.S. Cl.
CPC .......... *G06N 7/005* (2013.01); *G06F 3/0484* (2013.01); *G06F 16/24578* (2019.01); *G06F 16/367* (2019.01); *G06N 5/006* (2013.01); *G06N 5/025* (2013.01); *H04L 67/1008* (2013.01)

(58) Field of Classification Search
CPC .......... G06N 7/005; G06N 7/02; G06N 7/023; G06N 7/06; G06N 5/006; G06N 5/025; G06F 16/367; G06F 16/24578; G06F 3/0484; G06F 3/048; G06F 9/505; H04L 67/1008
See application file for complete search history.

(56) References Cited

U.S. PATENT DOCUMENTS 7,644,052 B1 * 1/2010 Chang .................... G06N 5/022
706/45
8,620,964 B2 * 12/2013 Tsatsou ................. G06F 16/367
707/798

(Continued)

*Primary Examiner* — Jenee Holland
(74) *Attorney, Agent, or Firm* — Russel Primeaux; Jessica Engler; Kean Miller LLP

(57) ABSTRACT

The invention is ontology-based architecture for performing semantic data mining for insights. The major components of the architecture are illustrated using Network Ontology (NO), an ontology generated for the network domain for delivering improved network management. In addition, algorithms for summarizing performance profiles in the form of rank tables and for extracting insight rules (concrete action plan) from the rank tables are presented. By using this approach, an actionable plan for assisting decision maker can be obtained, as domain knowledge is incorporated in the system. Experimental results on a network dataset show that this model provides an optimal action plan for a network to improve its performance by encoding data-driven rules into the ontology and suggesting changes to its current network configuration.

14 Claims, 7 Drawing Sheets

(56) References Cited

U.S. PATENT DOCUMENTS

| | | | |
|---|---|---|---|
| 10,489,373 B1* | 11/2019 | Alda | G06F 16/23 |
| 2002/0188586 A1* | 12/2002 | Veale | G06F 16/367 |
| 2003/0177112 A1* | 9/2003 | Gardner | G16B 50/00 |
| 2003/0227480 A1* | 12/2003 | Polk | G06F 11/3692 715/762 |
| 2005/0197995 A1* | 9/2005 | Badt, Jr. | H04L 67/24 |
| 2005/0240831 A1* | 10/2005 | Balkman | G01R 1/025 714/46 |
| 2006/0161655 A1* | 7/2006 | Altenhofen | G06F 16/95 709/224 |
| 2008/0086466 A1* | 4/2008 | Baker | G06F 16/951 |
| 2008/0288442 A1* | 11/2008 | Feigenbaum | G06F 16/313 |
| 2009/0030897 A1* | 1/2009 | Hatami-Hanza | G06F 16/31 |
| 2009/0081994 A1* | 3/2009 | Drobot | H04M 1/72448 455/412.2 |
| 2009/0254512 A1* | 10/2009 | Broder | G06Q 30/02 |
| 2010/0036797 A1* | 2/2010 | Wong | G06F 16/9537 706/55 |
| 2010/0049676 A1* | 2/2010 | Devitt | H04L 41/12 706/12 |
| 2011/0040604 A1* | 2/2011 | Kaib | G06Q 30/02 709/224 |
| 2012/0197750 A1* | 8/2012 | Batra | G06Q 30/0631 705/26.7 |
| 2013/0091113 A1* | 4/2013 | Gras | G06F 16/94 707/706 |
| 2013/0132365 A1* | 5/2013 | Chang | G06Q 30/0241 707/710 |
| 2014/0089090 A1* | 3/2014 | Thrasher | G06F 16/951 705/14.54 |
| 2014/0164432 A1* | 6/2014 | Hsieh | G06F 16/367 707/776 |
| 2015/0286969 A1* | 10/2015 | Warner | G06Q 10/0633 705/7.27 |
| 2015/0331850 A1* | 11/2015 | Ramish | G06F 16/245 704/9 |
| 2016/0232160 A1* | 8/2016 | Buhrmann | G06F 16/367 |
| 2019/0220534 A1* | 7/2019 | Singh | G06F 16/2365 |

\* cited by examiner

FIGURE 5

| S. No | Node No | Traffic Load | Node Density | Rank |
|---|---|---|---|---|
| 1 | M | L | L | 3 |
| 2 | M | M | L | 6 |
| 3 | M | H | L | 6 |
| 4 | M | L | H | 3 |
| 5 | M | M | H | 6 |
| 6 | M | H | H | 6 |
| 7 | H | L | L | 2 |
| 8 | H | M | L | 1 |
| 9 | H | H | L | 5 |
| 10 | H | L | H | 2 |
| 11 | H | M | H | 1 |
| 12 | H | H | H | 5 |
| 13 | L | L | L | 12 |
| 14 | L | M | L | 9 |
| 15 | L | H | L | 8 |
| 16 | L | L | H | 12 |
| 17 | L | M | H | 9 |
| 18 | L | H | H | 8 |

FIGURE 6

| No. | Insight rules |
|---|---|
| 1 | If (Macprotocol = 'Macdot11', Routing = 'AODV', Scheduling = 'Round Robin', Number of Nodes = 'Medium', Traffic Load = 'Low', Transmission Range = 'Low')<br>Then (Suggested Number of Nodes = 'Low', Suggested Traffic Load = 'Low', Suggested Transmission Range = 'Low') |
| 2 | If (Macprotocol = 'Macdot11', Routing = 'AODV', Scheduling = 'Round Robin', Number of Nodes = 'High', Traffic Load = 'Medium', Transmission Range = 'Low')<br>Then (Suggested Number of Nodes = 'Low', Suggested Traffic Load = 'Medium', Suggested Transmission Range = 'Low') |
| 3 | If (Macprotocol = 'Macdot11', Routing = 'AODV', Scheduling = 'Round Robin', Number of Nodes = 'High', Traffic Load = 'Medium', Transmission Range = 'High')<br>Then (Suggested Number of Nodes = 'Low', Suggested Traffic Load = 'Medium', Suggested Transmission Range = 'High') |

FIGURE 7

| Target size\Target Probability | Random (the selection probability is in proportion to split between number of cases in target vs. low rank categories) | 0.75 | 0.6 | 0.4 | 0.25 |
|---|---|---|---|---|---|
| Top 10% | Very Picky – No Experience | Very Picky – Very Low Experience | Very Picky – Low Experience | Very Picky – More Experience | Very Picky – Most Experience |
| Top 20% | Picky – No Experience | Picky – Very Low Experience | Picky – Low Experience | Picky – More Experience | Picky – Most Experience |
| Top 30% | Less Picky – No Experience | Less Picky – Very Low Experience | Less Picky – Low Experience | Less Picky – More Experience | Less Picky – Most Experience |

ARCHITECTURE AND METHOD FOR PROVIDING INSIGHTS IN NETWORKS DOMAIN

CROSS REFERENCE TO RELATED APPLICATION

This application claims priority to the U.S. Provisional Application No. 62/403,972, filed on Oct. 4, 2016, titled "Architecture and Method for Providing Insights in Wireless Networks Domain."

STATEMENT REGARDING FEDERALLY SPONSORED RESEARCH OR DEVELOPMENT

Not applicable.

REFERENCE TO A "SEQUENCE LISTING", A TABLE, OR COMPUTER PROGRAM

Not applicable.

DESCRIPTION OF THE DRAWINGS

The drawings constitute a part of this specification and include exemplary examples of the ARCHITECTURE AND METHOD FOR PROVIDING INSIGHTS IN NETWORKS DOMAIN, which may take the form of multiple embodiments. It is to be understood that in some instances, various aspects of the invention may be shown exaggerated or enlarged to facilitate an understanding of the invention. Therefore, drawings may not be to scale.

FIG. 5 provides an exemplary rank table generated for a simulated network with respect to a particular combination of uncontrollable parameters (namely, MACDOT11, ROUND-ROBIN, and AODV), where the minimum and maximum possible ranks are 0 and 14, respectively.

FIG. 6 provides the Insight rules that were generated for the 1, 8, and 11 combinations of the rank table shown in FIG. 5.

FIG. 7 provides a table of five categories of users across two dimensions, which is referenced in the illustrative example of evaluating generated insights discussed herein.

FIELD OF THE INVENTION

Figure 1:
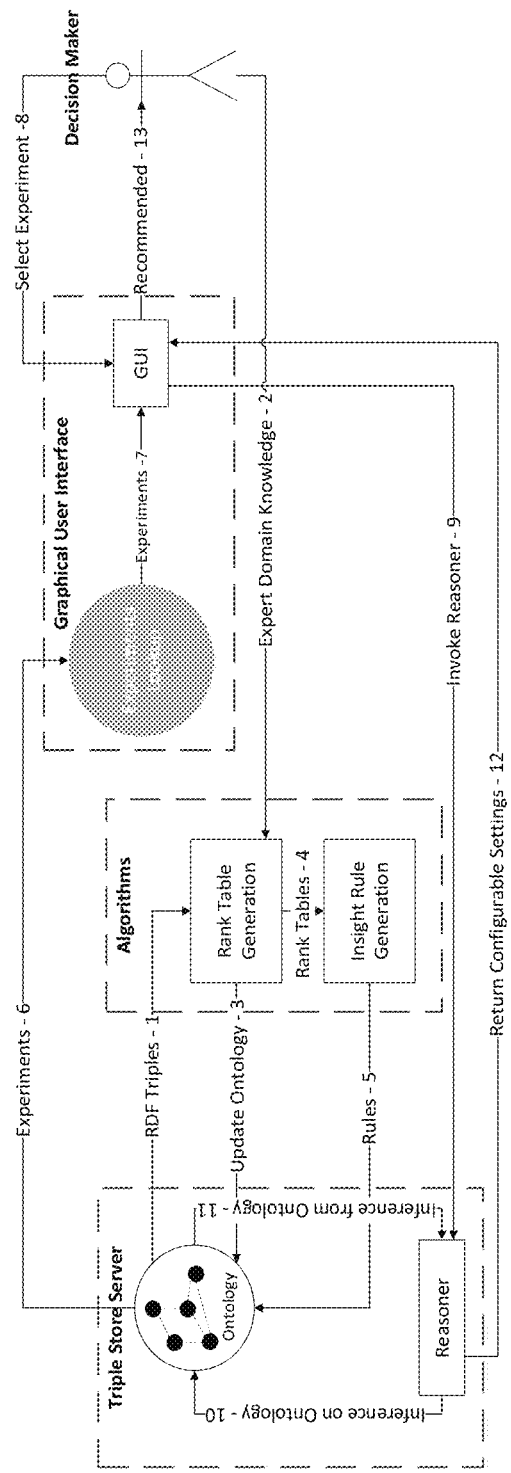
FIG. 1 provides a chart rendering of the disclosed architecture for the ontology-based network management system.

This invention generally relates to the field of ontology engineering. More specifically, this invention relates to insight-as-a-service technology to aid decision makers by providing concrete action plans, involving a comparative analysis of patterns derived from the data and the extraction of insights from that analysis, in order to deliver improved network management.

BACKGROUND OF THE INVENTION

Data mining, or Knowledge Discovery from Data ("KDD"), is the extraction of patterns representing knowledge implicitly stored or captured in data. Han, J. Kamber, M. and Pei, J, "Data mining: concepts and techniques" (Elsevier 2011). The challenge of extracting knowledge from data draws upon research in statistics, databases, pattern recognition, machine learning, data visualization, optimization, and high performance computing to deliver advanced business intelligence and web discovery solutions. "Knowledge Discovery and Data Mining", IBM (last accessed Sep. 28, 2017) Researcher.ibm.com In the process of KDD, the use of the domain knowledge of domain experts is very important and its importance in data mining has been stressed in previous literature. Kopanas, I., Avouris, N. M., and Daskalaki, S., The role of domain knowledge in a large scale data mining project. *In Methods and Applications of Artificial Intelligence* (pp. 288-299) (Springer Berlin Heidelberg 2002). More specifically, the importance of domain knowledge is significant in certain steps (problem definition, data preprocessing and transformation, and fielding the knowledge base) of the KDD process. Kopanas, I., et al.

Domain knowledge engineering is defined as the process of generating an ontology using semantic web technologies, such as "OWL" (Ontology Web Language). Said differently, domain engineering is the process of reusing domain knowledge in order to produce new software systems. Ontology has been identified as the explicit specification of "conceptualization" or terms in the domain and relations among them. Gruber, T. R. (1993). A translation approach to portable ontology specifications. *Knowledge acquisition,* 5(2), 199-220. Conceptualization is the semantic description of a domain using a vocabulary of relevant concepts, along with the relationship between the concepts and their restrictions. Specification is, explicitly specifying this conceptualization formally using a web ontology language (i.e. OWL-Lite, OWL-DL, and OWL-Full). Ontologies incorporate domain knowledge in the form of formal semantics, and data mining on these ontologies is called semantic data mining. Relational data can also be represented using ontologies. Passin. Thomas B. (2004). "Describing data with RDF" in Explorer's guide to the semantic web. Greenwich: Manning. By representing relational data using ontologies (i.e., RDF triples), data that doesn't fit in any relational table structures can be added to ontologies, and logical reasoning can also be done on ontologies to identify unstated relationships.

As ontology encodes formal semantics it has the potential in assisting various data mining tasks. In earlier work, ontology-based approaches were explored for two main reasons: (1) Knowledge representation; and (2) Improving accuracy by semantic data mining.

Knowledge Representation:

Ontology-based information extraction (OBIE), a subfield of information extraction (IE) has also emerged as ontologies provide formal and explicit specifications of conceptualizations that play a key role in the IE process. Karkaletsis, V., Fragkou, P., Petasis, G., and Iosif, E. (2011). Ontology based information extraction from text. *In Knowledge-driven multimedia information extraction and ontology evolution* (pp. 89-109). Springer Berlin Heidelberg. Ontology-based recommender system was developed where ontologies, because of its ability to provide semantic knowledge structures, is used to address the cold-start problem of a recommender system. Middleton, S. E., Alani, H., and De Roure, D. C. (2002). Exploiting synergy between ontologies and recommender systems. A semantic sensor network (SSN) ontology was built in which the main focus was describing the sensors, observations and its related concepts. Compton, M., Barnaghi, P., Bermudez, L., GarciA-Castro, R., Corcho, O., Cox, S. and Taylor, K. (2012). The SSN ontology of the W3C semantic sensor network incubator group. *Web Semantics: Science, Services and Agents on the World Wide Web*, 17, 25-32. Automation of network management system by integrating network management information and policies (rules) using ontologies was also proposed. Xiao, D., and Xu, H. (2006, November). An integration of ontology-based and policy-based network management for automation. *International Conference on Intelligent Agents, Web Technologies and Internet Commerce*, IEEE. Ontologies helps in formalizing network management information, sensor networks data, network security, policies (behavior or rules), and integration of different models. As, mobile-ad hoc networks (MANET) was maturing, a MANET distributions function ontology (MDFO) was built and incorporated in MDFO management mechanism (MMM). Orwat, M. E., Levin, T. E., and Irvine, C. E. (2008, March). An ontological approach to secure MANET management. *In Availability, Reliability and Security* (pp. 787-794) IEEE. MDFO incorporate the semantics of security features in a MANET and commonly used decision parameters. By using MDFO any parameter that is required by the MMM can be inferred for accurate decision-making process.

Improving Accuracy by Semantic Data Mining:

Friendship links can be predicted with more accuracy by using features constructed based on interest ontology. Bahirwani, V., Caragea, D., Aljandal, W., and Hsu, W. H. (2008). Ontology engineering and feature construction for predicting friendship links in the live journal social network. *In The 2nd SNA-KDD Workshop* (Vol. 8). Prediction of network attacks was also proposed using ontology-driven inference. Salahi, A., and Ansarinia, M. (2013). Predicting Network Attacks Using Ontology-Driven Inference. Accuracy in prediction of the network attacks was improved compared to traditional models by incorporating semantics (rules) pertaining to network attacks depending on the data. Onto4AR framework used domain ontology to represent background knowledge, that can be used to impose constraints (is-a, has-a) in the association rule mining process, and thereby, mine only more interesting patterns. Antunes, C. (2008, October). An ontology-based framework for mining patterns in the presence of background knowledge. *In 1st International Conference on Advanced Intelligence* (pp. 163-168). A system built on event ontology, where event ontology was developed using Extended Multimedia Web Ontology Language (E-MOWL) was able to detect events and also improve personalized multimedia information retrieval because ontologies serve as semantical structural representation of a domain. Pahal, N., Chaudhury, S., & Lall, B. (2013, November). Extending mowl for event representation (e-mowl). *In Proceedings of the 2013 IEEE/WIC/ACM International Joint Conferences on Web Intelligence (WI) and Intelligent Agent Technologies (IAT)-Volume 03* (pp. 171-174).

Recently, the new technology of insights-as-a-service, is receiving greater attention in big data. Pal, Kaushik. (2016, February) How 'Insights-As-A-Service' Is Growing Based On Big Data. Kdnuggets.com. Insights-as-a-service is a technology that assists a decision maker by delivering a concrete plan obtained from analyzing the insights of data (i.e., prescriptive analytics). Murali Pusala, M. Amini Salehi, Jayasimha Katukuri, Ying Xie, and Vijay Raghavan, *Massive Data Analysis: Applications and Challenges*, Big Data Analytics, Springer Book, 2016. Prescriptive analytics (optimization, numeric modeling and simulation) is an emerging branch of data analytics that keeps track of the ultimate goal and guides the professional in decision-making. Prescriptive analytics along with ontology-based approach will improve the decision making process.

SUMMARY OF THE INVENTION

Aiming at exploiting the advantages of ontology-based approach and techniques for delivering insights of data, an ontology-based architecture for providing insights in domain is developed. The extraction of Network Ontology ("NO") is modeled by manually extracting semantics from the domain data represented as a relational database and domain expert. State-of-the-art data mining algorithms (Rank Table Generation and Rule Generation algorithms) were adapted to process the NO (RDF triples), thereby extracting constraint-based, optimally performing network configuration. The extraction of constraint-based, optimal patterns is made possible by the rules embedded into the ontology. These rules serve as a base for suggesting an action plan (i.e., new network configurations), so as to improve the performance of the network.

In the above described ontology-based approaches, ontologies are used as the medium to represent domain knowledge and behavior (rules). Also, because of the structural representation of knowledge (data) using ontologies, the suggestions or results delivered by ontology-based systems to the end user are more accurate. In this current disclosure, ontology is used to represent domain knowledge and provide better recommendations to the decision maker. However, the unique aspect in this invention is that the decision making process of a decision maker is aided by extracting insights from analyzing the data. Extracting insights from the data is a new technology that will better aid the decision maker. In order to validate the proposed approach, Insight rules are extracted from analyzing the data and Insight rules are encoded in a network ontology. These types of insights serve as the basis for suggesting a concrete action plan to the decision maker to improve the performance of a network. More specifically, this invention discloses an ontology-based architecture for providing insights in the network domain.

DETAILED DESCRIPTION OF THE INVENTION

As an initial matter, the following terms are defined as follows:

Uncontrollable Parameters.

The parameters that cannot be tuned to improve the performance of a network configuration are called uncontrollable parameters. For example, in a network simulation, the uncontrollable parameters could be (but are not limited to) the routing protocol, scheduling of the packets, or Medium Access Control (MAC) protocol. The uncontrollable parameters are parameters that cannot be changed by the network management system to improve the performance of the network.

Controllable Parameters.

The parameters that can be tuned to improve the performance of a network configuration are called controllable parameters. In the context of a simulated network of an experiment, examples of controllable parameters are the number of nodes, node density, or traffic load. These are parameters that can be changed by the network management system to improve the performance of the network.

Generalization and Ranking of a Network Configuration.

Rank of a specific network configuration indicates the overall performance of a network considering such configuration. As an example, consider a simulated network dataset D which consists of several network configurations. Each network configuration corresponds to a different experiment. The network performance metrics (Delay, Jitter, Throughput, or Packet Delivery Ratio) can be discretized from zero (bad performance e.g., Delay is high) to two (excellent performance, e.g., Delay is low). The rank of an experiment can be the summation of all the performance metrics. The higher the rank value, the better the network performance will be in this specific experiment (i.e., network configurations).

Number of Rank Tables for a Simulated Network Dataset D.

Defined as the total number of different possible combinations possible with respect to uncontrollable parameters, where each uncontrollable parameter can have any number of types. Consider a simulated network dataset D, in which each unit is a network. For the simulated dataset D, assume that each uncontrollable parameter has two types: Mac Protocol (MacDot11, MacDot11e), Scheduling (Round-Robin, Strict-Priority), Routing (Aodv, Olsrv2-Niigata). Then, the number of rank tables for the dataset D is 8 ($2^3$).

Combinations in a Rank Table R for a Simulated Network Dataset D.

Defined as the total number of different possible combinations possible with respect to controllable parameters, where each controllable parameter can have any number of categories. Consider a simulated network dataset D, in which each unit is a network. For the simulated dataset D, assume that each controllable parameter is divided into two categories: Number of nodes (Low, Medium, and High), Node density (Low, and High), Traffic Load (Low, Medium, and High). Then, the number of combinations in a rank table R for the simulated dataset D is 18 (3*2*3).

Insight Rule.

The insight rule recommends a plan to improve the rank (category) of current combination of parameters (network configuration) based on its distances to the other combinations of parameters with respect to the "target rank" (category) specified in a rank table.

The target rank category is the category where the rank (performance) of controllable parameters combination is healthy (i.e. satisfactory performance quality) in a rank table. Consider the rank table shown in FIG. 5, generated for example purposes for a simulated network with respect to a particular combination of uncontrollable parameters (namely, MACDOT11, ROUND-ROBIN, and AODV), where the minimum and maximum possible ranks are 0 and 14, respectively. Now imagine that the rank is divided to two equal width categories, which means [0-7] is Low rank, [7-14] is High rank. In FIG. 5, the Target Rank Category can be the category consisting of High rank categories. Controllable parameter combinations 13, 14, 15, 16, 17 and 18 are under target rank category.

The Optimal Insight rule is derived based on the controllable parameter combination, which has the minimum distance to the input pattern (controllable parameter combination) over all distances to different combinations of controllable parameters and has the highest rank in terms of performance among controllable parameter combinations within the target rank (category) in a rank table. Here, the distance is defined as the number of attribute value differences between two combinations of the controllable parameters. Consider the rank table shown in Table 1 again. Consider combination 7, the distance between combination 7 and the combinations in target rank category in the rank table are 1 (combination 13), 2 (combination 14), 2 (combination 15), 2 (combination 16), 3 (combination 17), 3 (combination 18). Thus the optimal distance is 1 between combination 7 and 13 (Rule: Node No from H to L). Some examples of Insight rules are: Examine Insight rule is moving number of nodes from M to L, and keep the other network configurations as they were before (move from combination 4 to combination 16). For combinations 13 and 16, however, there will be no Insight rules, because these sort of networks are already performing well and by analyzing the insights of the data there is no controllable parameter combination that is better than these two combinations in the Target Rank Category. In cases where there are two or more Insight rules that are the same minimum distance away from any input parameter combination, then one that has the highest rank is considered to generate the Insight rule. These kinds of Insight rules can aid decision makers in making better decisions.

Now, herein disclosed is an inventive ontology-based insight generation system, which has three phases. In the first phase, the semantics are extracted from relevant network data stored as a relational database and capture it in the ontology. In the second phase, more semantics are added to the ontology by asking the decision maker about the uncontrollable parameters (network mac protocol, network scheduling, network routing), the boundaries to be used for the discretization of the controllable parameters (number of nodes, transmission range, traffic load) and the performance metrics (Delay, Jitter, PDR, Throughput). This domain knowledge is used by the rank table generation algorithm to generate rank tables. Finally, in the last phase, insight rules are generated by applying the insight rule Generation Algorithm to each of the rank tables and the insight rules are then encoded and stored in the ontology. The decision maker selects a network configuration, and the system suggests actions that need to be taken to improve the performance of the network configuration (experiment). The system architecture of an ontology-based architecture for providing insights in the networks domain is first shown and described. This system can be implemented in multiple forms of network domains, including but not limited to wireless domains. In the preferred embodiment, the domain to be assessed is a wireless network domain. Then, a detailed description of the rank table generation and the insight rule generation algorithms are presented, respectively.

An ontology-based architecture for providing insights in the network domain is shown in FIG. 1. The three components of our system architecture are the graphical user interface, the algorithms, and the triple store server.

The graphical user interface ("GUI") itself is the interface through which the decision maker interacts with the system. The GUI is comprised of the experiments lookup, which is the service available for the decision maker by which he/she can look up a network configuration's performance.

Two algorithms are disclosed herein. The rank table generation algorithm generates rank tables. The insight rule generation algorithm generates insight rules.

The triple store server has two sub-components. The ontology is the Network Ontology ("NO"). The Reasoner is an interference engine that can check for inconsistencies among a knowledge base of rules and will invoke appropriate insight rules, encoded in the ontology.

FIG. 1 also shows the step-by-step workflow of the proposed architecture. The number beside each labeled arrow represents that step's order in the overall process. The proposed approach is as follows:

First, the NO (Ontology) is first built by capturing the semantics of the simulated network data.

Next, the Rank Table Generation algorithm is applied. The algorithm receives input from the ontology (RDF Triples—Step 1) and the decision maker about controllable, uncontrollable parameters, and performance metrics and their discretizations (Expert Domain Knowledge—Step 2). The outputs of the algorithm are rank tables. These rank tables are summarized profiles of network configurations, so the information in the rank tables is used to update the ontology (Update Ontology—Step 3).

Then, these rank tables (Rank Tables—Step 4) also serve as input to the Insight Rule Generation algorithm. The insight rule generation algorithm generates insight rules and these are encoded in the ontology (Rules—Step 5). Steps 1-5 correspond to knowledge base creation.

Following this, the experiments lookup service will facilitate (Experiments—Step 6, Experiments—Step 7) the decision maker through the GUI to explore the experiments whose performance he/she wishes to improve.

Finally, the decision maker through the GUI selects an experiment (Select Experiment—Step 8). After the selection and submission of an experiment by the decision maker the reasoner is invoked (Invoke reasoner—Step 9). The reasoner enables inference on the ontology (Inference on Ontology—Step 10) by applying relevant insight rules encoded in the ontology and receives inference from the ontology (Inference from Ontology—Step 11). These inferred recommended configurable settings (Return Configurable Settings—Step 12) are displayed to the decision maker (Recommended—Step 13). Steps 6-13 correspond to functions of the GUI.

The rank table gives information about a network configuration's (experiment) performance, at an aggregate level, by generalizing the granular data about the nodes in a network configuration. The inputs to the algorithm are triples of the ontology, uncontrollable parameters and its values, controllable parameters and their discretizations, and the number of discretizations of each performance metric. Based on these inputs, the rank table generation algorithm generalizes the data and provides a summary of the data for each network configuration. The output of the algorithm is the list of rank tables.

A step-by-step high-level description of the rank table generation algorithm is as follows:

Input:
- TRIPLES, an network ontology;
- Uncontrparam_list, a list of uncontrollable parameters (uncontroparams$_i$);
- Uncontrollableparamvalues, a set of possible values of each uncontrollable parameter (uncontroparams$_i$);
- Contrparam_list, a list of controllable parameters (controparams$_i$);
- NumberofCateg, number of categories for each controllable parameter (controparams$_i$);
- PerfMetricCateg, number of categories for each performance metric (perfmetric$_j$).

Output:
- RankTable_List, a list of rank tables.

Method:
1. Combofranktablenames_list ← get_comb_of_uncont_params(Uncontrparam_list, Uncontrollableparamvalues(uncontroparams$_i$));
   //Let Combofranktablenames_list hold all the possible combinations of uncontrollable parameter values (combofranktablenames$_i$).
2. Combofeachrowinranktable_list ← get_comb_of_cont_params(Contrparam_list, NumberofCateg(controparams$_i$));
   //Let Combofeachrowinranktable_list hold all the possible combinations of controllable parameters, with respect to number of categories of each controllable parameter (combofeachrowinranktable$_k$).
3. Categorize all performance metrics and controllable parameters of each network configuration (experiment) and update the ontology. // This is implemented as follows:
   RankTableTriples_List ← get_triplesof_currentranktable_combination (combofranktablenames$_i$, SPARQLQUERY, TRIPLES); //For each combination of rank table names combofranktablenames$_i$, retrieve all the triples pertaining to the current combination of rank table combofranktablenames$_i$, by performing a SPARQLQUERY.
   For the retrieved triples RankTableTriples_List, for each performance metric perfmetric$_j$ of an experiment in the current combination of rank table comboofranktablenames$_i$ categorize them into bins based on the number of bins for each performance metric (PerfMetricCateg), replace the original performance metric values by corresponding category label after discretization. Similarly, this step should also be done for each controllable parameters (controparams$_i$) using number of categories for each controllable parameter (NumberofCateg). After doing this for all the experiments in each combination of the rank table names combofranktablenames$_i$, update the TRIPLES ontology.
4. Compute sum of the performance metrics perfmetric$_j$ of each experiment to obtain the "Rank" value of each experiment. Later, compute average of the "Rank" values of all the experiments under certain combination of controllable parameters combofeachrowinranktable$_k$, of each rank table comboofranktablenames$_i$ and generate values for the "Rank" column of the rank tables. // This is implemented as follows.
   UpdatedRankTableTriples_List ← get_triplesof_currentranktable_combination (combofranktablenames$_i$, SPARQLQUERY, TRIPLES); //For each combination of rank table names combofranktablenames$_i$, retrieve all the triples pertaining to the current combination of rank table combofranktablenames$_i$, by performing a SPARQLQUERY.
   For the retrieved triples UpdatedRankTableTriples_List, for each experiment compute sum of all the performance metrics perfmetric$_j$ to obtain the "Rank" of each experiment under certain combination of controllable parameters, combofeachrowinranktable$_k$ that -continued belongs to rank table comboofranktablenames$_j$,. Next, aggregate the controllable parameters combinations combofeachrowinranktable$_k$, by computing the average of "Rank" values of all experiments, under each combination combofeachrowinranktable$_k$. in the rank table comboofranktablenames$_j$. Now generate a rank table for comboofranktablenames$_j$, with combofeachrowinranktable$_k$ and its rank. Finally add this rank table to RankTable_List.

Figure 3:
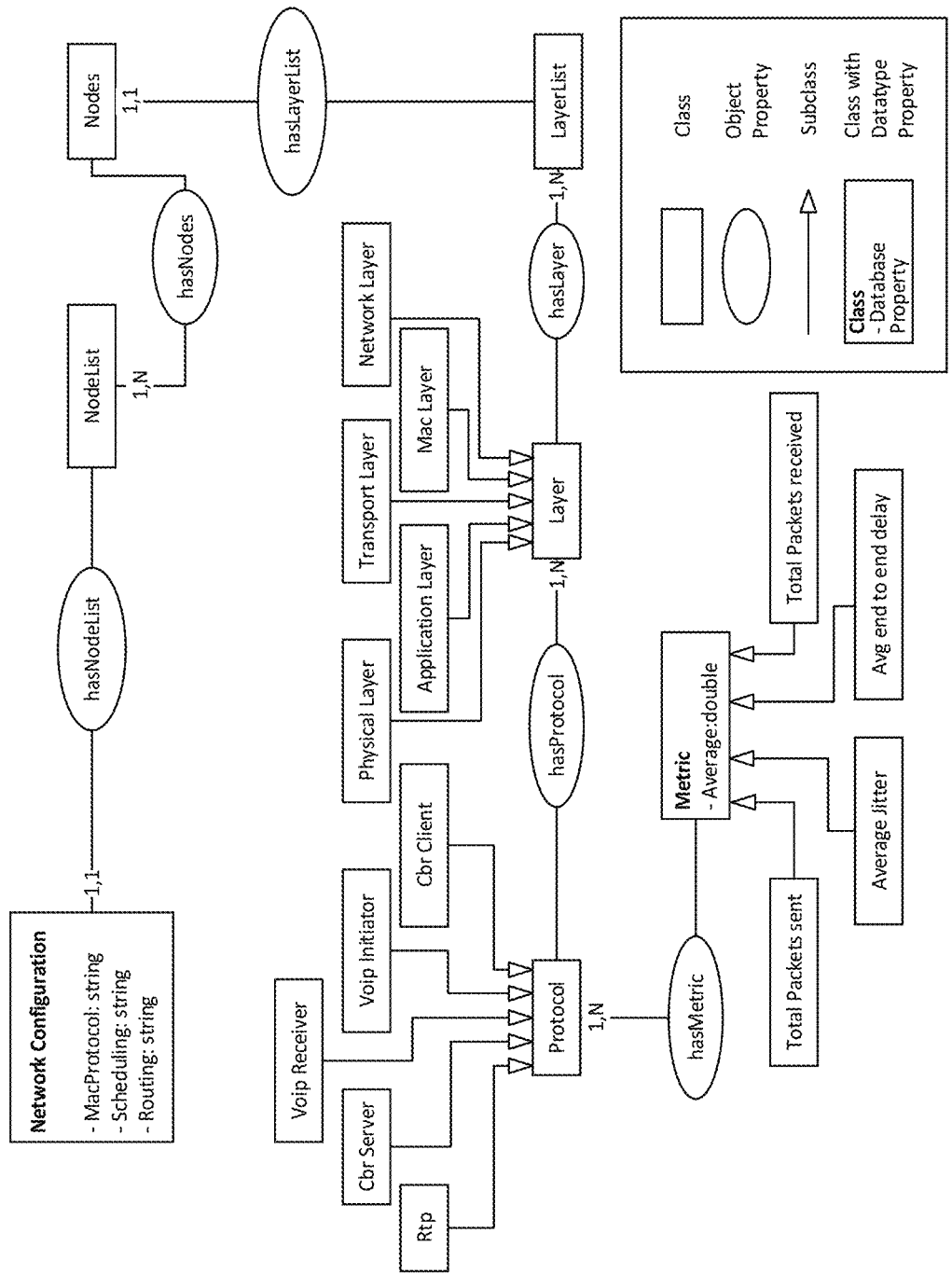
FIG. 3 provides a flowchart showing the Resource Description Framework schema of the Network Ontology capturing the information of the dataset.

The Insight Rule Generation Algorithm extracts the knowledge (patterns) from the rank table (generalized data) in the form of insight rules. These insight rules are encoded in the ontology and are useful in suggesting to a decision maker the action plan that needs to be taken to improve the performance of an experiment. The algorithm takes a list of rank tables as input. The output of the algorithm is, list of insight rules. The rule generation algorithm extracts insights for each row r$_k$ in each rank table ranktable$_j$, A step-by-step high-level description of insight rule generation algorithm without details of the data types is as follows:

lated network dataset. The process of extracting semantics from a relational database can be automated by breaking down relational data into Resource Description Framework (RDF) triples and identifying relationship between the different triples. RDF schema of NO after Phase 1 is shown in FIG. 3. In FIG. 3, the concepts in the ontology are classes, the data properties are data types in the classes, and the object properties are shown with an oval shape between two classes along with their cardinality. As shown in FIG. 3, an individual in class Network Configuration is related to one and only one individual in class NodeList through the property hasNodeList. Each individual in class Network Input:
- RankTable_List, a list of rank tables (ranktable$_i$).

Output:
- Insight_Rule_List, a list of rules.

Method: Insight extraction for each row r$_k$, in a rank table ranktable$_j$, and generating insight rules.
// This is implemented as follows:
a) Inisght_ext ← get_inisght_rule(r$_k$, ranktable$_j$);
   // get_insight_rule(r$_k$, ranktable$_j$) function returns an optimal row r$_k$' (Definition 4)
   based on distances between r$_k$, and different combinations of controllable parameters
   with respect to target rank category in a rank table ranktable$_j$.
b) Insight_ext_Rule ← Insight_ext(r$_k$, r$_k$')
   // Now insight rule for row r$_k$, in rank table ranktable$_j$, constructed by comparing
   values in r$_k$ and r$_k$'.
c) Insight_Rule_List ← Insight_Rule_List ∪ Inisght_ext_Rule.
   // The list of insight rules is the union of Insight_Rule_List, and Insight_ext_Rule. In
   case if there is no insight rule for row r$_k$, meaning, row r$_k$, in rank table ranktable$_j$ is
   already optimized with respect to network performance, the Insight_ext for such rows
   will be "null".

Figure 2:
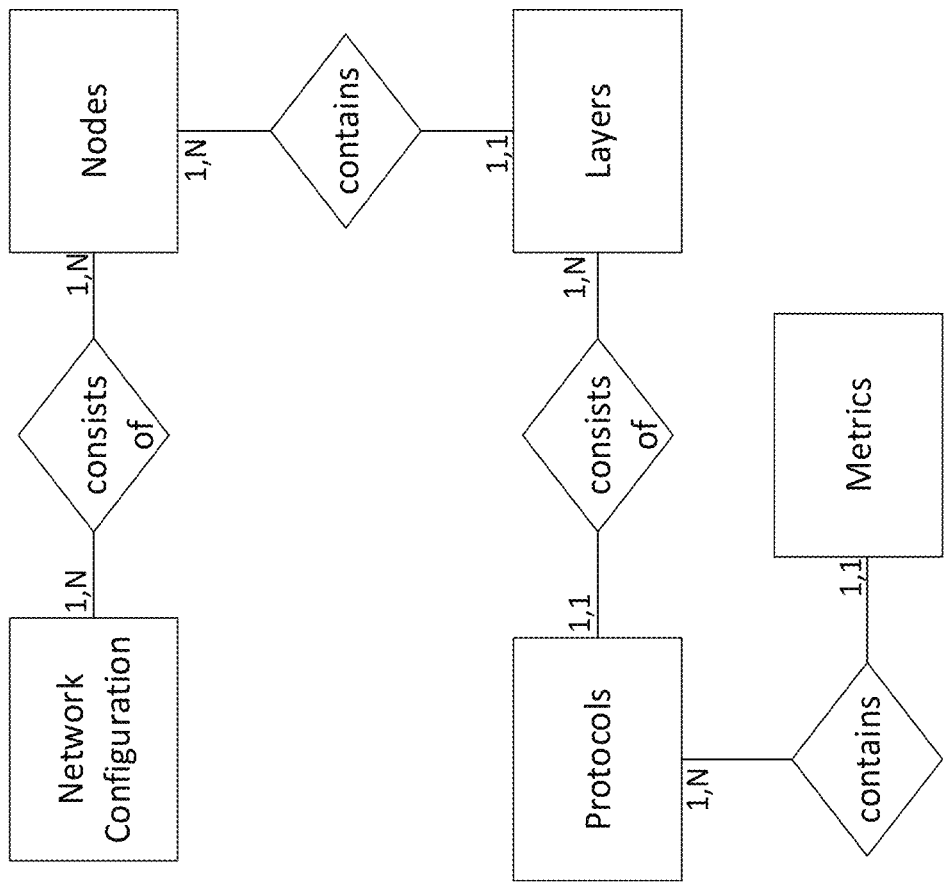
FIG. 2 provides a flowchart of the entity relationship diagram of the simulated network dataset.

A simulated network dataset was used for an experimental study to demonstrate the disclosed architecture and method. The entity relationship diagram of the simulated network dataset is shown in FIG. 2. Each network configuration (experiment) consists of one or many number of nodes (Computers), each node participates in one or more network configurations (experiments), each node contains networking layers (Physical, MAC, Network, Transport, and Application layers), each layer belongs to one and only one node, each layer consists of different protocols, each protocol belongs to one and only one layer and contains one or many metrics measured, and each metric belongs to one and only one protocol.

The dataset consisted of 144 network configurations (experiments). For each experiment, a different combination of networking protocols (e.g., Mac Protocol (MacDot11, MacDot11e), Scheduling (Round-Robin, Strict-Priority), Routing (Aodv, Olsrv2-Niigata), Number of Nodes (9, 36, 81), Node Density (5 or 9 nodes), and Traffic Load (21, 51, 81)) has been selected.

As stated previously, there are three phases in building the proposed ontology-based architecture for providing insights in the network domain:

Phase I:

In the first phase, a Network Ontology (NO) is constructed by manually extracting semantics from the simulated Configuration has a mac protocol, scheduling, and routing. Individuals in class NodeList is related to one or more individuals in class Nodes through the property hasNodes. An individual in class Nodes is related to one and only one individual in class LayerList through the property hasLayerList. Individuals in class LayerList is related to one or more individuals in class Layer through the property hasLayer. The class Layer has Application, Mac, Physical, Network, and Transport Layers as its subclasses. Individuals in class Layer is related to one or more individuals in class Protocol through the property hasProtocol. Class Protocol has Voip Receiver, Voip Initiator, Cbr Client, Cbr Server, Rtp as its sub classes. Individuals in class Protocol is related to one or more individuals in class Metric through the property hasMetric. Class Metric has Total Packets Received, Total Packets Sent, Average Jitter, Average end-to-end delay as its subclasses. Each individual in class Metric has an average measured.

This RDF schema stores network configuration used in experiments, such as: number of network nodes (a node can participate in any number of Network Configurations), different networking layers present in each node, types of protocols in every layer, and parameters measured for each protocol. NodeList and LayerList are two anonymous concepts used. While NodeList is used to capture the nodes that participate in an experiment, LayerList is used to capture different layers in a node.

Phase II:

In the beginning of second phase, the average of all the performance metrics for each network configuration is computed as a preprocessing step. In this phase, the focus is to extend NO by applying rank table generation algorithm on (1) RDF triples from NO, and (2) Expert knowledge provided by decision maker. The algorithm provides an aggregated view of a network performance of each experiment, in the form of rank tables. A sample rank table is shown in FIG. 5 (Section—II). Simultaneously, this aggregated information about the experiments is added to NO.

Individuals in class Network configuration are related to only one individual in classes Cbr Delay, Cbr Jitter, Cbr PDR, Rtp Jitter, Throughput, Voip Delay, and Voip PDR through properties hasCbrDelay, hasCbrJitter, hasCbrpdr, hasrtpjitter, hasThroughput, hasvoipdelay, hasvoippdr, respectively. Each of these classes have sub classes of Low, Medium, and High. Also, individuals in class Network Configuration are related to only one individual in classes Number of Nodes, Traffic Load, and Transmission Range through properties hasnoofnodes, hastrafficload, and hastransrange, respectively. Classes, Number of Nodes and Traffic Load have Low, Medium, and High as their sub-classes. Class Transmission Range has Low, High as its sub-classes. Also, each individual in class Network Configuration has a mac protocol, scheduling, and routing.

Figure 4:
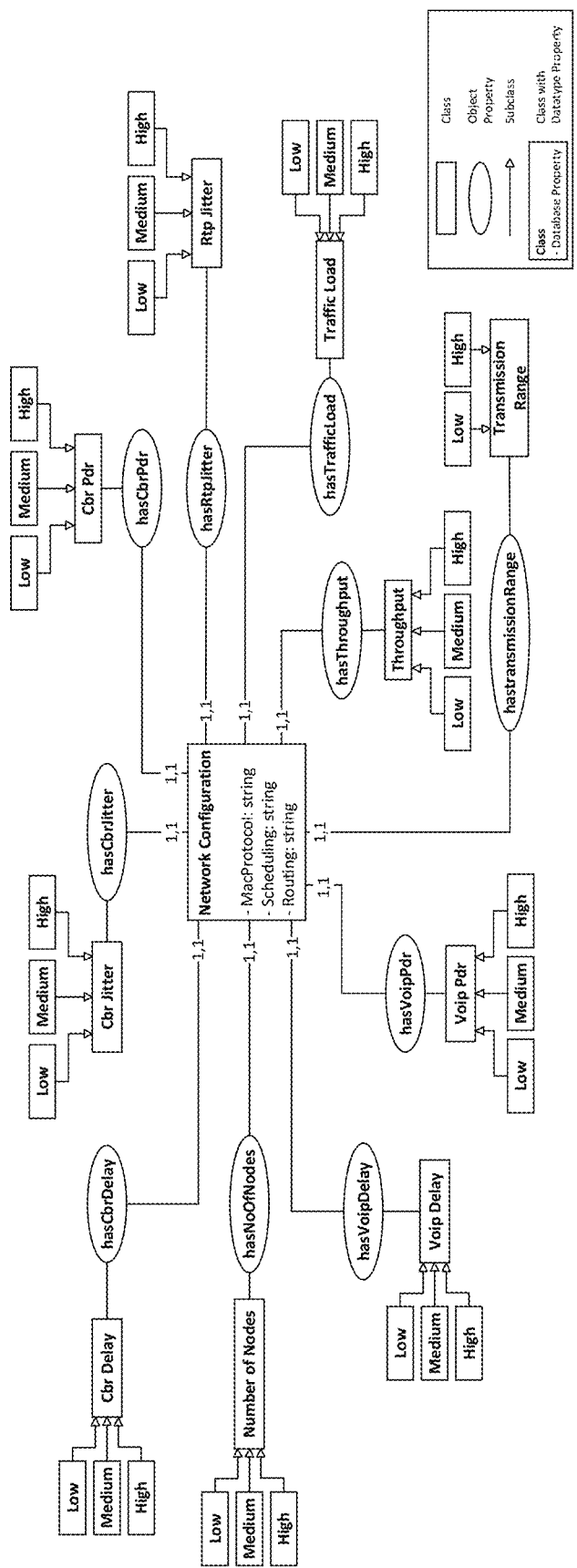
FIG. 4 depicts part of the Resource Description Framework schema after completion of the second phase of the disclosed method.

The part of RDF schema, shown in FIG. 4, stores information about network configuration parameters, and its performance. These network configuration parameters are divided as uncontrollable and controllable parameters. The uncontrollable parameters are Mac Protocol, Scheduling, and Routing. Each of the uncontrollable parameter has two possibilities: Mac Protocol (MacDot11, MacDot11e), Scheduling (Round-Robin, Strict-Priority), Routing (Aodv, Olsrv2-Niigata). As there are three uncontrollable parameters and each has two possibilities, so there will be eight combinations. For each combination of uncontrollable parameters a rank table is generated. Thus, eight rank tables are generated and NO is simultaneously updated. A sample rank table for one such combination (MacDot11, Round-Robin and AODV) is shown in Table 1. Each row in a rank table corresponds to a combination of discretization of controllable parameters (Number of Nodes, Transmission Range, Traffic Load). Each controllable parameter has the following possibilities: Number of Nodes (Low, Medium, High), Transmission Range (Low, High), and Traffic Load (Low, Medium, High). Since there are three controllable parameters and two of them have three possibilities and one of them has two possibilities, there are eighteen combinations. The rank of each combination in a rank table is the summation of all performance metrics (Cbr Delay, Cbr Jitter, Cbr PDR, Rtp Jitter, Throughput, Voip Delay, and Voip PDR), where each performance metric is discretized as 0 (Bad Performance), 1 (Average Performance), and 2 (Good Performance). Therefore, for each network configuration in the rank table, the higher its total rank, the better the network performance will be if this configuration is used.

Phase III:

This phase completes the proposed ontology-based network management system by generating insight rules using Insight rule generation algorithm on the rank tables and encoding them back into the ontology. A sample list of insight rules generated for combinations 1, 8, and 11 of FIG. 5, is shown in FIG. 6. Insight rule 2 can be interpreted as, if a network configuration has Mac protocol configured as "Macdot11", Scheduling as "Round-Robin", Routing as "AODV", Number of Nodes as "High", Traffic Load as "Medium" and Transmission Range as "Low", then to improve network performance, number of nodes is suggested to change from "Medium" to "Low". Here, there is only one proposed change in insight rule 2 (moving number of nodes from "High" to "Low"), which is the optimal distance between combination 8 and 14 with respect to target rank category. Thus, the insight rule for combination 8 suggests an optimal action plan to improve its rank (performance). Similarly, other two insight rules also can be interpreted. Thereby, the proposed ontology-based architecture for providing insights in a network domain proposes an optimal action plan for any network to improve its rank (performance).

In order to provide an example of how to evaluate the quantitative performance of the disclosed ontology-based insight generation methods in a domain, the following experimental set up and analysis is provided:

As part of this analysis, two assumptions must first be made. First concerns the categorization of rank (i.e. low rank and target rank categories). Here, the experiment is assuming only two categories; otherwise, the insight rule generation algorithm (i.e., the algorithm generating rules by comparing a case, which could be in low rank category or target rank category, with the cases that are only in the target rank category) will have too many user type categorizations to check, making the search for better cases tedious. By varying the sizes of the two rank categories (i.e. low rank or target rank), a group of users can be characterized as more or less demanding. The smaller the size of the target rank category, the more demanding is the corresponding user type.

The second assumption—the query (case) chosen by the end user (i.e. the user selects a case) and depending on the user's selection, the improvement achieved by the system's suggestion (change in rank) varies. Here, we are assuming that the query (case) selection depends on the users' background knowledge and experience: a naïve user has minimal or no knowledge about the rank of a case and randomly queries (random selection of a case) the system. On the other hand, an experienced user more often queries about cases that belong to the low rank category.

Based on the above two assumptions, FIG. 7, is presented. Five different types of users are shown in FIG. 7, along two dimensions. In FIG. 7, when reviewing left to right, the user is more experienced, since an experienced user is more likely to ask for improvement of a case from the low rank category. Here, varying probabilities from left to right is the chance of a user to select a case from the target rank category.

In FIG. 7, when reviewing from top to bottom, the user is becoming less particular or his quality expectations more relaxed. When target size is top 10%, the user is wanting the minimum rank value that is acceptable to be in top 10%; but when target size is top 30%, then user is wanting minimum rank value that is acceptable to be in top 30%.

By varying the target size of rank categories, along with generating different query sets for different types of users there will be significant variation in the quantitative performance of the system.

The main goal of this type of experimental design is to quantify the performance of our ontology-based generation system. In the process of this quantification, we examine and analyze our results, identify how various system parameters can be tuned, and understand the types of users for which the system can provide high quality suggestions.

The experimental method is as follows: Categorize the rank by varying the width of the two (low rank and target rank) categories as stated and shown in FIG. 7 (moving from top to bottom of the table). In the current network domain, the minimum and maximum possible rank for a case is 0 and 14 for the experimental domain. The higher the rank value, better is the case performing.

For the first set of experiments, the target rank category is the top 10% of the cases and the low rank category is the remaining 90% of the cases. Here, it is assumed that the user is very picky and that the cases in target rank category size are performing well. For this type of discretization, generate the actionable insight rules and compute the number of cases in each category (low and target category). After this, generate randomly query set 1. Where, the query set 1 contains 25 queries. Here, equal probabilities are given for all the queries (i.e., the query or the selection of a case can be from the low rank category or target rank category with equal probability). The reason why this type of query set is generated here is because the user is assumed to be very picky, with no experience. Later, testing the system on query set 1, and calculate the quantitative performance of our system using the following formula:

$$QP_{obigs}(qs) = \frac{\sum_{i=1}^{N}(r'_i - r_i)}{N}$$

Where $QP_{obigs}(qs)$ stands for Quantitative Performance of ontology-based insight generation system for a query set. N is the number of queries in the query set. $r'_i$ is the new rank suggested by ontology-based generation system for query i. $r_i$ is the old rank for query i.

Repeat the procedure described above, but, with varying probabilities as to match the different types of users shown in FIG. 7 (left to right of the table). As stated earlier, the probability distribution of the remaining four generated query sets are as follows: (i) For query set 2, the chance for the query to be from low rank category is 0.25 and from target rank category is 0.75 (Very Low Experience); (ii) For query set 3, the chance for the query to be from low rank category is 0.40 and from target rank category is 0.60 (Low Experience); (iii) For query set 4, the chance for the query to be from low rank category is 0.60 and from target rank category is 0.40 (More Experience); and (iv) For query set 5 the chance for the query to be from low rank category is 0.75 and from target rank category is 0.25 (Most Experience).

For the second set of experiments (five experiments), the target rank category is the top 20% of the cases and the low rank category is the remaining 80% of the cases. The user here is assumed to be picky. Later, generate five query sets (no experience, very low experience, low experience, more experience, most experience) and follow the procedure described above.

For the third set of experiments (five experiments), the target rank category is the top 30% of the cases and the low rank category is the remaining 70% of the cases. Here, the user is assumed to be less picky. Later, generate five query sets (no experience, very low experience, low experience, more experience, most experience) and follow the procedure described above.

At this time, the change in the quantitative performance can be observed, as the size of target category varies along with the variation in the probability distribution of the query sets.

The benefit of type of experimental design is to guide the users of "ontology-based architecture for providing insights", in better categorization of rank (i.e. low rank and target rank categories). This is a key component in generating optimal insights (knowledge).

The described features, advantages, and characteristics may be combined in any suitable manner in one or more embodiments. One skilled in the relevant art will recognize that the various components of this design may be practiced without one or more of the specific features or advantages of a particular embodiment. In other instances, additional features and advantages may be recognized in certain embodiments that may not be present in all embodiments.

Reference throughout this specification to "one embodiment", "an embodiment", or similar language means that a particular feature, structure, or characteristic described in connection with the embodiment is included in at least one embodiment. Thus the appearance of the phrase "in one embodiment", "in an embodiment", and similar language throughout this specification may, but do not necessarily, all refer to the same embodiment.

We claim:
1. A method for providing insights in a network domain to a decision maker, comprising:
 (a) Building an ontology which is a wireless network ontology for the network domain;
 (b) applying a rank table generation algorithm, comprising:
  i. the rank table generation algorithm receiving input from the ontology and the decision maker, said input comprising:
   i. controllable parameters;
   ii. uncontrollable parameters;
   iii. performance metrics; and
   iv. discretization of the controllable parameters and performance metrics;
  ii. the rank table generation algorithm generates an output, comprising rank tables; and
  iii. using information in the rank tables to update the ontology;
 (c) inputting the rank tables into an insight rule generation algorithm;
 (d) applying a insight rule generation algorithm to generate insight rules;
 (e) encoding the insight rules into the ontology;
 (f) using a graphic user interface to operate an experiments lookup service;
 (g) selecting an experiment to perform;
 (h) submitting the selected experiment;
 (i) invoking the reasoner, wherein the reasoner:
  i. enables an inference on the ontology by applying the encoded insight rules;
  ii. receives an inference from the ontology; and
 (g) displaying at least one inferred recommended configurable setting to the decision maker.

2. The method of claim 1, wherein the rank table generation algorithm comprises:
 (a) providing an input;
 (b) providing an output, comprising a list of rank tables;
 (c) providing a list of Combination of Rank Table Names, wherein a list of Combination Rank Table Names holds all possible combinations of uncontrollable parameter values;
 (d) providing a list of Combination of Each Row in Rank, wherein the list of Combination of Each Row in Rank holds all possible combinations of the controllable parameters, with respect to a number of categories for each controllable parameter;

(e) categorizing the performance metrics and controllable parameters of the experiment;

(f) computing a sum of the performance metrics of each experiment to generate a rank value for each experiment;

(g) computing an average of the rank values of all experiments under decision-maker selected controllable parameters of each rank table;

(h) generating values for a Rank column of the rank tables;

(i) generating a rank table for the list of Combination Rank Table Names, comprising a combination of each row in rank table and a corresponding rank; and (j) adding the rank table to the list of rank tables.

3. The method of claim 2, wherein the input comprises:
(a) a network ontology;
(b) a list of uncontrollable parameters;
(c) a set of possible values for each uncontrollable parameter;
(d) a list of controllable parameters;
(e) a number of categories for each controllable parameters; and
(f) a number of categories for each performance metric.

4. The method of claim 2, wherein the output comprises a list of rank tables.

5. The method of claim 2, wherein categorizing the performance metrics and controllable parameters of the experiment comprises the following steps:
(a) for each Combination of Rank Table Names, retrieve all triples pertaining to a pertinent Combination of Rank Table Names by performing a SPARQLQUERY test;
(a) for the retrieved triples, for each performance metric of the experiment in the Combination of Rank Table Names, categorize each into bins, wherein a number of bins corresponds to a number of performance metrics;
(b) replacing original performance metric values with a corresponding category label after discretization;
(c) repeating categorizing for each controllable parameter using a number of categories for each controllable parameter;
(d) completing the experiments in each Combination of Rank Table Names; and
(e) updating the ontology.

6. The method of claim 2, wherein computing the sum of the performance metrics of each experiment to obtain a rank value for each experiment comprises the following steps:
(a) for each Combination of Rank Table Names, retrieve all triples pertaining to the pertinent Combination of Rank Table Names; and
(b) for the retrieved triples for each experiment compute the sum of all performance metrics to obtain the Rank of each experiment under decision-maker selected combination of controllable parameters that belongs to the rank table.

7. The method of claim 6, wherein the triples are retrieved by performing a SPARQLQUERY.

8. The method of claim 1, wherein the rank table generation algorithm comprises:
(a) providing as inputs the following:
i. providing a list of Combination of Rank Table Names, wherein the list of Combination Rank Table Names holds all possible combinations of uncontrollable parameter values;
ii. providing a list of Combination of Each Row in Rank, wherein the list of Combination of Each Row in Rank holds all possible combinations of the controllable parameters, with respect to a number of categories for each controllable parameter;
iii. categorizing the performance metrics and controllable parameters of the experiment;
(b) computing a sum of the performance metrics of each experiment to generate a rank value for each experiment;
(c) computing an average of the rank values of all experiments under decision-maker selected controllable parameters of each rank table;
(d) providing outputs in the following:
i. generating values for a Rank column of the rank tables;
ii. generating a rank table for the list of Combination Rank Table Names, comprising the combination of each row in rank table and a corresponding rank; and
(e) adding the rank table to the list of rank tables.

9. The method of claim 8, wherein categorizing the performance metrics and controllable parameters of the experiment comprises the following steps:
(a) for each Combination of Rank Table Names, retrieve all triples pertaining to a pertinent Combination of Rank Table Names by performing a SPARQLQUERY test;
(b) for the retrieved triples, for each performance metric of the experiment in the Combination of Rank Table Names, categorize each into bins, wherein a number of bins corresponds to the number of performance metrics;
(c) replacing original performance metric values with a corresponding category label after discretization;
(d) repeating categorizing, for each controllable parameter using a number of categories for each controllable parameter;
(e) completing the experiments in each Combination of Rank Table Names; and
(f) updating the ontology.

10. The method of claim 8, wherein computing the sum of the performance metrics of each experiment to obtain a rank value for each experiment comprises the following steps:
(a) for each Combination of Rank Table Names, retrieve all triples pertaining to the pertinent Combination of Rank Table Names; and
(b) for the retrieved triples for each experiment compute the sum of all performance metrics to obtain the Rank of each experiment under decision-maker selected combination of controllable parameters that belongs to the rank table.

11. The method of claim 10, wherein the triples are retrieved by performing a SPARQLQUERY.

12. The method of claim 1, wherein insight rule generation algorithm comprises:
(a) an input, comprising a list of rank tables;
(b) an output, comprising a list of insight rules;
(c) performing insight extraction for each row in a rank table; and
(d) generating at least one insight rule.

13. The method of claim 12, wherein performing insight extraction comprises the following steps:
(a) applying the get_insight_rule(rk, ranktablei) function, which returns an optimal row rk' based on the distances between each row (rk) and different combinations of controllable parameters with respect to a target rank category in the rank table (ranktablei);

(b) construct an insight rule for row rk in rank table by comparing the values in rk and rk'; and
(c) create list of insight rules.

14. A method for constructing an architecture for providing insights in a network domain, comprising:
  (a) constructing a Network Ontology, comprising:
     i. manually extracting semantics from a network dataset;
     ii. automatically extracting semantics from a relational database by breaking down relational data into Resource Description Framework triples;
     iii. identifying relationships between different triples; and
     iv. forming Resource Description Framework (RDF) schema;
       wherein the RDF schema stores network configuration parameters used in experiments;
       wherein the network configuration patterns are divided into two categories comprising controllable parameters; and uncontrollable parameters;
  (b) computing the average of all metrics for each network configuration;
  (c) generating a rank table for each combination of uncontrollable parameters,
     wherein a rank of each combination is the summation of all performance metrics; and
     wherein each performance metric is discretized;
  (a) updating the Network Ontology;
  (b) generating at least one insight rule, comprising:
     i. applying an insight rule generation algorithm on rank tables; and
     ii. encoding the insight rule into the Network Ontology.

* * * * *